US010435593B2

(12) United States Patent
Ko et al.

(10) Patent No.: US 10,435,593 B2
(45) Date of Patent: Oct. 8, 2019

(54) THERMORESPONSIVE SMART ADHESIVE PAD

(71) Applicant: UNIST(ULSAN NATIONAL INSTITUTE OF SCIENCE AND TECHNOLOGY), Ulju-gun, Ulsan (KR)

(72) Inventors: Hyun Hyub Ko, Ulju-gun Ulsan (KR); Ho Chan Lee, Ulju-gun Ulsan (KR)

(73) Assignee: UNIST(ULSAN NATIONAL INSTITUTE OF SCIENCE AND TECHNOLOGY, Ulju-gun, Ulsan (KR)

( * ) Notice: Subject to any disclaimer, the term of this patent is extended or adjusted under 35 U.S.C. 154(b) by 144 days.

(21) Appl. No.: 15/561,376

(22) PCT Filed: Dec. 2, 2016

(86) PCT No.: PCT/KR2016/014099
§ 371 (c)(1),
(2) Date: Sep. 25, 2017

(87) PCT Pub. No.: WO2017/217619
PCT Pub. Date: Dec. 21, 2017

(65) Prior Publication Data
US 2018/0194974 A1    Jul. 12, 2018

(30) Foreign Application Priority Data
Jun. 14, 2016 (KR) .................. 10-2016-0073609

(51) Int. Cl.
*C09J 7/35* (2018.01)
*B32B 27/06* (2006.01)
(Continued)

(52) U.S. Cl.
CPC ................... *C09J 7/35* (2018.01); *B32B 3/26* (2013.01); *B32B 3/30* (2013.01); *B32B 27/06* (2013.01);
(Continued)

(58) Field of Classification Search
CPC ................ C09J 7/35; C09J 7/385; B32B 3/26
See application file for complete search history.

(56) References Cited

U.S. PATENT DOCUMENTS

| 7,402,339 B2 | 7/2008 | Schmidt et al. |
| 2007/0286883 A1 | 12/2007 | Lensen et al. |
| 2014/0030490 A1 | 1/2014 | Crosby et al. |

FOREIGN PATENT DOCUMENTS

| KR | 10-2006-0080389 A | 7/2006 |
| KR | 10-2009-0127770 A | 12/2009 |

(Continued)

OTHER PUBLICATIONS

Materials Research Society, Fall Meeting & Exhibit Guide, Nov. 29-Dec. 4, 2015, 2 pages.

*Primary Examiner* — Victor S Chang
(74) *Attorney, Agent, or Firm* — Casimir Jones, S.C.; Robert A. Goetz

(57) ABSTRACT

At least one example embodiment relates to a thermoresponsive smart adhesive pad. Provided is a thermoresponsive smart adhesive pad that includes a polymer layer including a plurality of concave grooves; a hydrophilic surface layer formed on the polymer layer; and a coating layer including a hydrogel and formed on the hydrophilic surface layer. Also, provided is a method of manufacturing a thermoresponsive smart adhesive pad, including forming a plurality of convex structures on a substrate; forming a plurality of concave grooves in a polymer layer using the substrate on which the plurality of convex structures are formed; forming a hydrophilic surface layer by performing a hydrophilic treatment of a surface of the polymer layer in which the plurality of concave grooves are formed; forming, on the hydrophilic surface layer, a coating layer including a mixed solution containing a hydrogel monomer; and irradiating ultraviolet (UV) rays to the coating layer.

13 Claims, 5 Drawing Sheets

(51) Int. Cl.
    *B32B 27/16*     (2006.01)
    *B32B 3/26*     (2006.01)
    *B32B 3/30*     (2006.01)
    *C09J 7/38*     (2018.01)
    *C09J 7/00*     (2018.01)

(52) U.S. Cl.
    CPC ............... *B32B 27/16* (2013.01); *C09J 7/00* (2013.01); *C09J 7/385* (2018.01); *B32B 2405/00* (2013.01); *C09J 2477/003* (2013.01); *C09J 2483/001* (2013.01)

(56) References Cited

FOREIGN PATENT DOCUMENTS

| | | |
|---|---|---|
| KR | 10-1004329 B1 | 12/2010 |
| KR | 10-2012-0076044 A | 7/2012 |
| KR | 10-2013-0046842 A | 5/2013 |
| KR | 10-2014-0012522 A | 2/2014 |
| KR | 10-2014-0035501 A | 3/2014 |

THERMORESPONSIVE SMART ADHESIVE PAD

TECHNICAL FIELD

At least one example embodiment relates to a thermoresponsive smart adhesive pad, and more particularly, to a thermoresponsive smart adhesive pad that includes a polymer layer including a plurality of concave grooves; a hydrophilic surface layer formed on the polymer layer; and a thermoresponsive hydrogel coating layer formed on the hydrophilic surface layer.

BACKGROUND ART

An adhesive pad according to a related art has a low adhesive strength and a low adhesion switching ratio at adhesion or removal. Also, applying a load to a bearing element in advance to increase a stiffness of an object, to fill a gap or to prevent abrasion is referred to as "pre-load." Generally, due to a pre-load applied when the adhesive pad is used, there was a limitation in practical industrial applications. In particular, in a semiconductor industry, to transfer a nanostructure to a desired substrate, there is a technical need to minimize a pre-load for adhesion, a high adhesion switching ratio, and a change in adhesive properties of a smart adhesive pad on demand.

FIG. 1 illustrates an adhesive pad according to a related art. Referring to FIG. 1, the adhesive pad is formed by attaching a release paper onto a bottom surface of a hot melt adhesive (HMA) that is supplied in a form of a fabric from an extruder and simultaneously by coating a top surface of the HMA with a protective film. A pressing operation is performed by supplying the release paper and the protective film adhering to the HMA using a press. In the pressing operation, the HMA to which the release paper and the protective film adhere is cut into a predetermined shape using a cutting and creasing die, to manufacture the adhesive pad of FIG. 1.

The adhesive pad includes the protective film and the HMA on the release paper. An adhesive material of the HMA includes an epoxy-based hot melt material that may be hardened at a high temperature, has a stickiness to stick to an operator's hand, peripheral parts, and the like, and is provided in a form of a sheet with a release paper attached to one side.

To attach or detach the adhesive pad of FIG. 1 to or from a desired portion, a high pre-load is required.

However, due to the above issues, the adhesive pad has a limitation in practical industrial applications. In particular, in a semiconductor industry, to transfer a nanostructure to a desired substrate, it is important to minimize a pre-load applied for adhesion, a high adhesion switching ratio, and a change in adhesive properties of a smart adhesive pad on demand.

DISCLOSURE OF INVENTION

Technical Subject

The present disclosure is provided to solve the foregoing problems, and an aspect provides a smart adhesive pad that may have a high adhesive strength and a high adhesion switching ratio at adhesion or removal by mimicking adhesion mechanisms of creatures existing in nature, and that may not require a high pre-load for adhesion and a change in an adhesive strength on demand, in order to overcome problems of the related art, for example, a low adhesive strength, a low adhesion switching ratio at adhesion or removal, or a necessity for a high pre-load.

Solutions

According to an aspect, there is provided a thermoresponsive smart adhesive pad including a polymer layer including a plurality of concave grooves; a hydrophilic surface layer formed on the polymer layer; and a coating layer including a hydrogel and formed on the hydrophilic surface layer.

The polymer layer may include at least one selected from the group consisting of polydimethylsiloxane, polyethylene, polypropylene, polycarbonate, polystyrene, polymethyl methacrylate, polychlorinated biphenyl, hydrophobically-treated silicon, polymethylphenylsiloxane and tetramethyldisiloxane.

The plurality of concave grooves may be consecutively arranged at regular intervals.

A distance between centers of neighboring concave grooves among the plurality of concave grooves ranges from 4 micrometers ($\mu$m) to 12 $\mu$m.

The plurality of concave grooves may have a maximum diameter of 0.5 $\mu$m to 7 $\mu$m and a maximum depth of 0.5 $\mu$m to 2 $\mu$m.

The hydrophilic surface layer may be formed by performing an $O_2$ plasma treatment or ultraviolet (UV)/ozone treatment of a surface of the polymer layer.

The hydrogel may include at least one selected from the group consisting of poly(N-isopropylacrylamide) (poly(NIPAM)), poly(N-isopropylacrylamide-co-allylamine) (poly(NIPAM-co-AA)), poly(N-isopropylacrylamide-co-2-(dimethylamino)ethyl methacrylate) (poly(NIPAM-co-DMAEMA)), poly(N-isopropylacrylamide-co-2-(dimethylamino)ethyl acrylate) (poly(NIPAM-co-DMAEA)), poly(N-isopropylacrylamide-co-acrylic acid) (poly(NIPAM-co-AAc)), poly(N-isopropylacrylamide-co-methacrylic acid) (poly(NIPAM-co-MAAc)), poly(N, N-diethylacrylamide), poly(N-vinlycaprolactam), poly(ethylene glycol) and poly(ethylene glycol-b-propylene glycol-b-ethylene glycol).

The hydrogel may change a space volume in each of the concave grooves based on a temperature, and a rate of change in the space volume is greater than or equal to 200%.

The coating layer may contract at a temperature of 30° C. to 34° C. and expand at a temperature less than the temperature of 30° C. to 34° C.

The polymer layer may have a thickness of 500 $\mu$m to 1 centimeter (cm), and the coating layer may have a thickness of 70 nanometers (nm) to 110 nm.

According to another aspect, a method of manufacturing a thermoresponsive smart adhesive pad, including forming a plurality of convex structures on a substrate; forming a plurality of concave grooves in a polymer layer using the substrate on which the plurality of convex structures are formed; forming a hydrophilic surface layer by performing a hydrophilic treatment of a surface of the polymer layer in which the plurality of concave grooves are formed; forming, on the hydrophilic surface layer, a coating layer including a mixed solution containing a hydrogel monomer; and irradiating UV rays to the coating layer.

The forming of the hydrophilic surface layer may include performing an $O_2$ plasma treatment or UV/ozone treatment of the surface of the polymer layer.

The mixed solution may include the hydrogel monomer. The hydrogel monomer may be photopolymerized by irradiating the UV rays.

Effects of the Invention

According to example embodiments, a thermoresponsive smart adhesive pad may have an excellent adhesion performance in comparison to other existing adhesive pads by mimicking a mechanism of octopus suckers, and may actively adjust an adhesion capability depending on circumstances in response to heat.

Also, the thermoresponsive smart adhesive pad may be applicable to semiconductor transfer printing technologies, to enhance an efficiency in development of smart printing technologies.

BEST MODE FOR CARRYING OUT THE INVENTION

Figure 1:
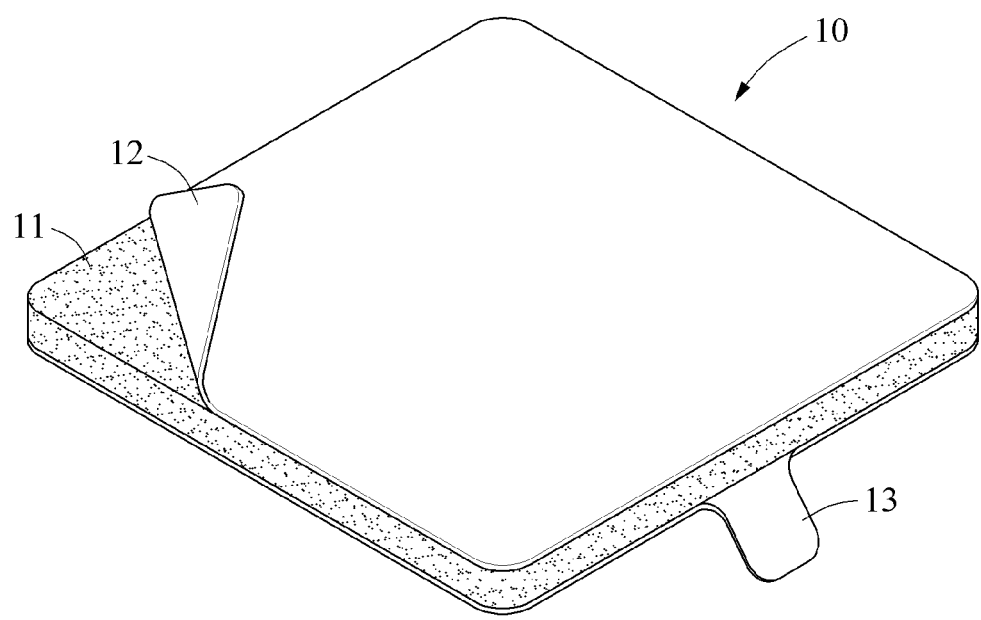
FIG. 1 is a perspective view illustrating an adhesive pad according to a related art.

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terminologies used herein are defined to properly describe the example embodiments and thus may be changed depending on a user, the intent of an operator, or a custom of a field to which the present disclosure pertains. Accordingly, the terminologies must be defined based on the following overall description of the present specification. Like reference numerals illustrated in the drawings refer to like constituent elements throughout the specification.

Throughout the specification, the term "comprises or includes" and/or "comprising or including" specify the presence of stated elements or components, but do not preclude the presence or addition of one or more other elements or components, unless mentioned otherwise.

Hereinafter, a thermoresponsive smart adhesive pad according to the present disclosure will be described in detail with reference to example embodiments and drawings. However, the present disclosure should not be construed as limited to the example embodiments and drawings.

According to an example embodiment, a thermoresponsive smart adhesive pad may be provided. The thermoresponsive smart adhesive pad may include a polymer layer including a plurality of concave grooves, a hydrophilic surface layer formed on the polymer layer, and a coating layer including a hydrogel and formed on the hydrophilic surface layer.

For example, a technology of actively adjusting an adhesion capability in a desired situation by mimicking an adhesion mechanism of octopus suckers may be applied to the thermoresponsive smart adhesive pad.

The present disclosure is provided to solve the foregoing problems, and an aspect provides a thermoresponsive smart adhesive pad that may be freely attached to or removed from an arbitrary outer surface due to characteristics, for example, a high adhesive strength, a high adhesion switching ratio at adhesion or removal, and the like, by eliminating problems of the related art, that is, a low adhesive strength, a low adhesion switching ratio at adhesion or removal, a necessity for a high pre-load, and the like. Thus, the thermoresponsive smart adhesive pad may not require a high pre-load required by the related art, and may have an excellent adhesive strength even when the thermoresponsive smart adhesive pad is used for a relatively long period of time due to the high adhesive strength and the high adhesion switching ratio. In the present disclosure, the adhesion switching ratio may refer to a ratio between a maximum adhesive strength and a minimum adhesive strength.

FIG. 1 is a perspective view illustrating an adhesive pad according to the related art. Referring to FIG. 1, an adhesive pad 10 according to the related art includes a hot melt adhesive (HMA) 11 and a protective film 12 on a release paper 13. An adhesive material of the HMA 11 includes an epoxy-based hot melt material that may be hardened at a high temperature, has a stickiness to stick to an operator's hand, peripheral parts, and the like, and is provided in a form of a sheet with the release paper 13 attached to one side. The adhesive pad having the above simple configuration has a problem of requiring a pre-load and a low adhesion switching ratio at adhesion and removal, as described above.

Thus, a thermoresponsive smart adhesive pad according to an example embodiment may not require a high pre-load that was required by the related art, and may have an excellent adhesive strength even when the thermoresponsive smart adhesive pad is used for a relatively long period of time due to a high adhesive strength and a high adhesion switching ratio at adhesion and removal.

The thermoresponsive smart adhesive pad may have an excellent adhesion performance in comparison to other existing adhesive pads by mimicking an adhesion and detachment mechanism of octopus suckers, and may actively adjust an adhesion capability depending on circumstances in response to an external temperature.

Also, a smart printing technology may be developed by applying the thermoresponsive smart adhesive pad to semiconductor transfer printing technologies, and thus it is possible to expect an increase in an efficiency.

Figure 2:
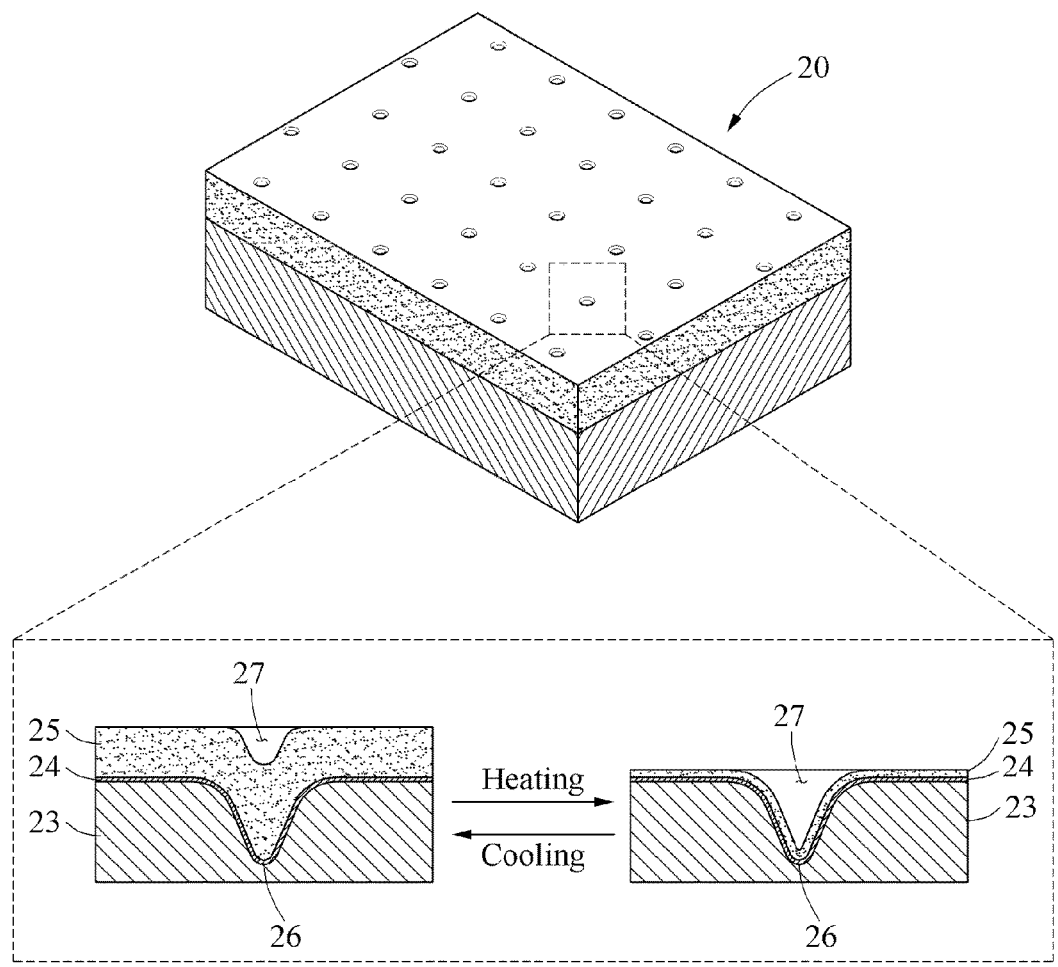
FIG. 2 illustrates a perspective view of a smart adhesive pad and a diagram of an adhesion mechanism based on a temperature according to an example embodiment.

FIG. 2 illustrates a perspective view of a smart adhesive pad and a diagram of an adhesion mechanism based on a temperature according to an example embodiment.

In a thermoresponsive adhesive pad shown in a lower left portion of FIG. 2, a polymer layer 23 with a concave groove 26, a hydrophilic surface layer 24 and a hydrogel coating layer 25 are sequentially laminated.

The polymer layer 23 may include, for example, an elastomer that has the same properties as those of a rubber. For example, polydimethylsiloxane (PDMS) may be used as a polymer layer.

For example, poly(N-isopropylacrylamide) (pNIPAM) may be used as a thermoresponsive hydrogel. The polymer layer 23 on which the hydrophilic surface layer 24 is formed may be coated with the pNIPAM. The hydrogel coating layer 25 may also be formed on a wall surface of a space 27 of the concave groove 26 formed in the polymer layer 23, for example, PDMS, on which the hydrophilic surface layer 24 is formed.

Referring to a lower portion of FIG. 2, a volume of the space in the concave groove 26 may change with a temperature. The volume may change due to a change in the hydrogel coating layer 25 based on the temperature. For example, the hydrogel coating layer 25 may change at a low temperature, for example, 3° C. as shown in the lower left portion, or at a high temperature, for example, 40° C. as shown in the lower right portion. Hereinafter, a process in which the hydrogel coating layer 25 changes in response to the temperature will be described.

The hydrogel coating layer 25 on the hydrophilic surface layer 24 formed on the polymer layer 23 may change a volume of the space 27 of the concave groove 26 by increasing or decreasing a volume through heating or cooling. In an example, when the temperature increases after a thermoresponsive smart adhesive pad 20 is in contact with a surface of a target material, the volume of the space 27 of the concave groove 26 may increase as a volume of the hydrogel coating layer 25 decreases. Accordingly, a pressure of the space 27 of the concave groove 26 may decrease and a difference in pressure between inside and outside of the concave groove 26 may occur, and thus an adhesive strength between the thermoresponsive smart adhesive pad 20 and the surface of the target material may increase. In another example, when the temperature decreases in a state in which the thermoresponsive smart adhesive pad 20 is attached to the surface of the target material, a reverse process to the above process may be performed. In this example, the volume of the hydrogel coating layer 25 may increase, and accordingly the volume of the space 27 of the concave groove 26 may decrease. The pressure of the space 27 of the concave groove 26 may increase and the difference in pressure between inside and outside of the concave groove 26 may be reduced, so as to decrease the adhesive strength between the thermoresponsive smart adhesive pad 20 and the surface of the target material. Thus, easy detachment may be possible.

The above processes may reversibly occur, and thus the present disclosure may have an adhesion and removal capability that may be reversibly changed.

Through the above processes, it may be found that a maximum diameter of the concave groove 26 changes based on the temperature.

A great change in a volume at 32° C. may be caused by pNIPAM used as a hydrogel of the thermoresponsive smart adhesive pad 20. At a temperature less than 32° C., the pNIPAM may become hydrophilic and swell by absorbing water around the thermoresponsive smart adhesive pad 20. At a temperature higher than or equal to 32° C., the pNIPAM may become hydrophobic and discharge water so that the volume may decrease.

The thermoresponsive smart adhesive pad 20 may use the hydrogel coating layer 25, for example, pNIPAM, as a thermoresponsive actuator, may actively adjust the volume of the space 27 of the concave groove 26 by the hydrogel coating layer 25 based on the temperature, and may mimic muscles of octopus suckers that may reversibly adjust an adhesion capability.

The polymer layer may include, for example, at least one selected from the group consisting of polydimethylsiloxane, polyethylene, polypropylene, polycarbonate, polystyrene, polymethyl methacrylate, polychlorinated biphenyl, hydrophobically-treated silicon, polymethylphenylsiloxane and tetramethyldisiloxane. The above materials may desirably have elasticity.

The plurality of concave grooves may be consecutively arranged at regular intervals. When the plurality of concave grooves are not arranged at regular intervals, an overall uniform adhesive strength may not be shown.

Among the plurality of concave grooves, a distance between centers of neighboring concave grooves may range from 4 micrometers (μm) to 12 μm. When the distance is less than 4 μm, a problem of a contact between concave grooves and a difficulty in a conformal contact to a target material may occur. When the distance exceeds 12 μm, the adhesive strength may decrease.

The plurality of concave grooves may have a maximum diameter of 0.5 μm to 7 μm and a maximum depth of 0.5 μm to 2 μm. When the maximum diameter is less than 0.5 μm, a sufficient space in a concave groove may not be secured and a pressure difference may not be formed, which may cause a problem of failing to secure the adhesive strength. When the maximum diameter exceeds 7 μm, a problem of a contact between concave grooves may occur, and the adhesive strength may decrease due to a relatively low rate of change in a space volume in a concave groove based on a temperature.

When the maximum depth is less than 0.5 μm, a sufficient space in a concave groove may not be secured and a pressure difference may not be formed, which may cause a problem of failing to secure the adhesive strength. When the maximum depth exceeds 2 μm, the adhesive strength may decrease due to a relatively low rate of change in a space volume in a concave groove based on a temperature.

Figure 3A:
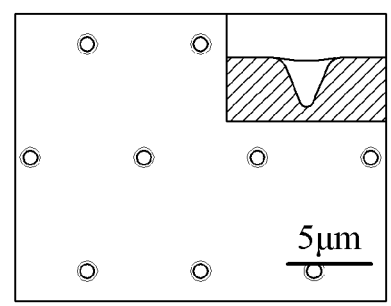
FIGS. 3A through 3D are diagrams illustrating different diameters, depths and shapes of concave grooves, and a distance between centers of neighboring concave grooves according to an example embodiment.
Figure 3B:
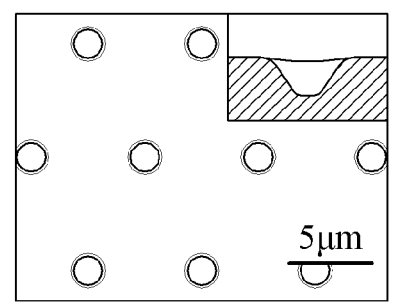
Figure 3C:
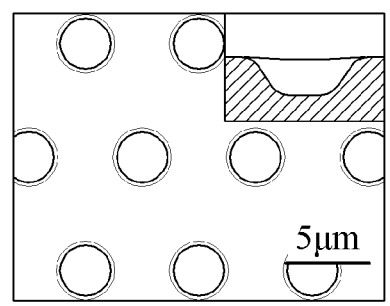
Figure 3D:
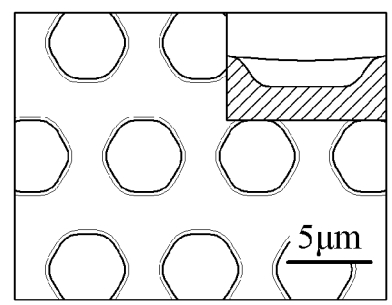

FIGS. 3A through 3D illustrate examples of the polymer layer 23 that includes concave grooves 26 with different diameters, depths and shapes and a distance between centers of neighboring concave grooves in a state in which the coating layer 25 is not formed according to an example embodiment. In FIG. 3A, each of concave grooves 26 has a diameter of 1.0 μm, and a distance between centers of neighboring concave grooves is 5.5 μm. In FIG. 3B, each of concave grooves 26 has a diameter of 2.5 μm, and a distance between centers of neighboring concave grooves is 7.0 μm. In FIG. 3C, each of concave grooves 26 has a diameter of 4.5 μm, and a distance between centers of neighboring concave grooves is 8.5 μm. In FIG. 3D, each of concave grooves 26 has a diameter of 6.5 μm, and a distance between centers of neighboring concave grooves is 11 μm. Also, a concave groove 26 may have a circular shape, or a hexagonal shape as shown in FIG. 3D. In addition, a bottom of a concave groove may be flat, concavely curved, or pointed.

The hydrophilic surface layer may be formed by performing an $O_2$ plasma treatment or ultraviolet (UV)/ozone treatment of a surface of the polymer layer. A hydrophilic treatment of the polymer layer may be performed due to the following reason. As described above, the polymer layer including the plurality of concave grooves used may be a hydrophobic elastic body. In a process of manufacturing a smart adhesive pad, a process of coating the polymer layer with a hydrogel monomer material mixed solution, and of polymerizing and forming a hydrogel by irradiating UV rays may be required. Because water is used as a solvent in the hydrogel monomer material mixed solution, the surface of the polymer layer may need to have hydrophilicity to uniformly coat the polymer layer with the hydrogel monomer material mixed solution.

The hydrogel may include at least one selected from the group consisting of poly(N-isopropylacrylamide) (poly(NI- PAM)), poly(N-isopropylacrylamide-co-allylamine) (poly (NIPAM-co-AA)), poly(N-isopropylacrylamide-co-2-(dimethylamino)ethyl methacrylate) (poly(NIPAM-co-DMAEMA)), poly(N-isopropylacrylamide-co-2-(dimethylamino)ethyl acrylate) (poly(NIPAM-co-DMAEA)), poly(N-isopropylacrylamide-co-acrylic acid) (poly(NIPAM-co-AAc), poly(N-isopropylacrylamide-co-methacrylic acid) (poly(NIPAM-co-MAAc)), poly(N, N-diethylacrylamide), poly(N-vinlycaprolactam), poly(ethylene glycol) and poly(ethylene glycol-b-propylene glycol-b-ethylene glycol). Volumes of the above hydrogels may change with the temperature. The volumes may vary by absorbing water around the hydrogels. For example, the hydrogel may be a monomer having both an iso-propyl group of a hydrophobic group and an amide group of a hydrophilic group in a molecule, and may have hydrophilicity or hydrophobicity based on a functional group activated based on a temperature, so that whether water is absorbed may be determined, and as a result, the volume may change. According to an example embodiment, a coating layer may suck moisture around a thermoresponsive smart adhesive pad at a low temperature, and accordingly a volume may increase. Thus, water or moisture may desirably be present around the thermoresponsive smart adhesive pad.

The hydrogel may change a space volume in the concave groove based on a temperature, and a rate of change in the space volume may be greater than or equal to 200%. The rate of change in the volume may refer to a rate of a largest volume of a space in a concave groove when the coating layer contracts at a high temperature with respect to a smallest volume of a space in a concave groove when the coating layer expands at a low temperature. When the rate is less than 200%, a sufficient adhesion switching ratio at adhesion and removal may not be secured.

The coating layer may contract at a temperature of 30° C. to 34° C. and expand at a temperature less than the temperature of 30° C. to 34° C. The temperatures for distinguishing the contracting from the expanding may vary depending on components of a hydrogel of the coating layer, a ratio of components, or a type of a solvent to be absorbed/discharged. Depending on circumstances, contraction and expansion may be distinguished based on a certain range, or may rapidly change based on a specific temperature. For example, when pNIPAM is used for a hydrogel coating layer, a volume may greatly change based on 32° C. due to the pNIPAM. At a temperature less than 32° C., the pNIPAM may become hydrophilic to readily absorb water and may swell. At a temperature higher than or equal to 32° C., the pNIPAM may become hydrophobic and discharge the absorbed water so that a volume may decrease.

The polymer layer may have a thickness of 500 μm to 1 centimeter (cm), and the coating layer may have a thickness of 70 nanometers (nm) to 110 nm. When the thickness of the polymer layer is less than 500 μm, a concave groove with a sufficient depth may not be formed. When the thickness of the polymer layer exceeds 1 cm, a total thickness of the thermoresponsive smart adhesive pad may excessively increase. When the thickness of the coating layer is less than 70 nm, a sufficient volume change rate based on a temperature may not be secured. When the thickness of the coating layer exceeds 110 nm, a space in a concave groove may not be secured.

According to an example embodiment, a method of manufacturing a thermoresponsive smart adhesive pad may be provided. The method may include forming a plurality of convex structures on a substrate; forming a plurality of concave grooves in a polymer layer using the substrate on which the plurality of convex structures are formed; forming a hydrophilic surface layer by performing a hydrophilic treatment of a surface of the polymer layer in which the plurality of concave grooves are formed; forming, on the hydrophilic surface layer, a coating layer including a mixed solution containing a hydrogel monomer; and irradiating UV rays to the coating layer.

Figure 4:
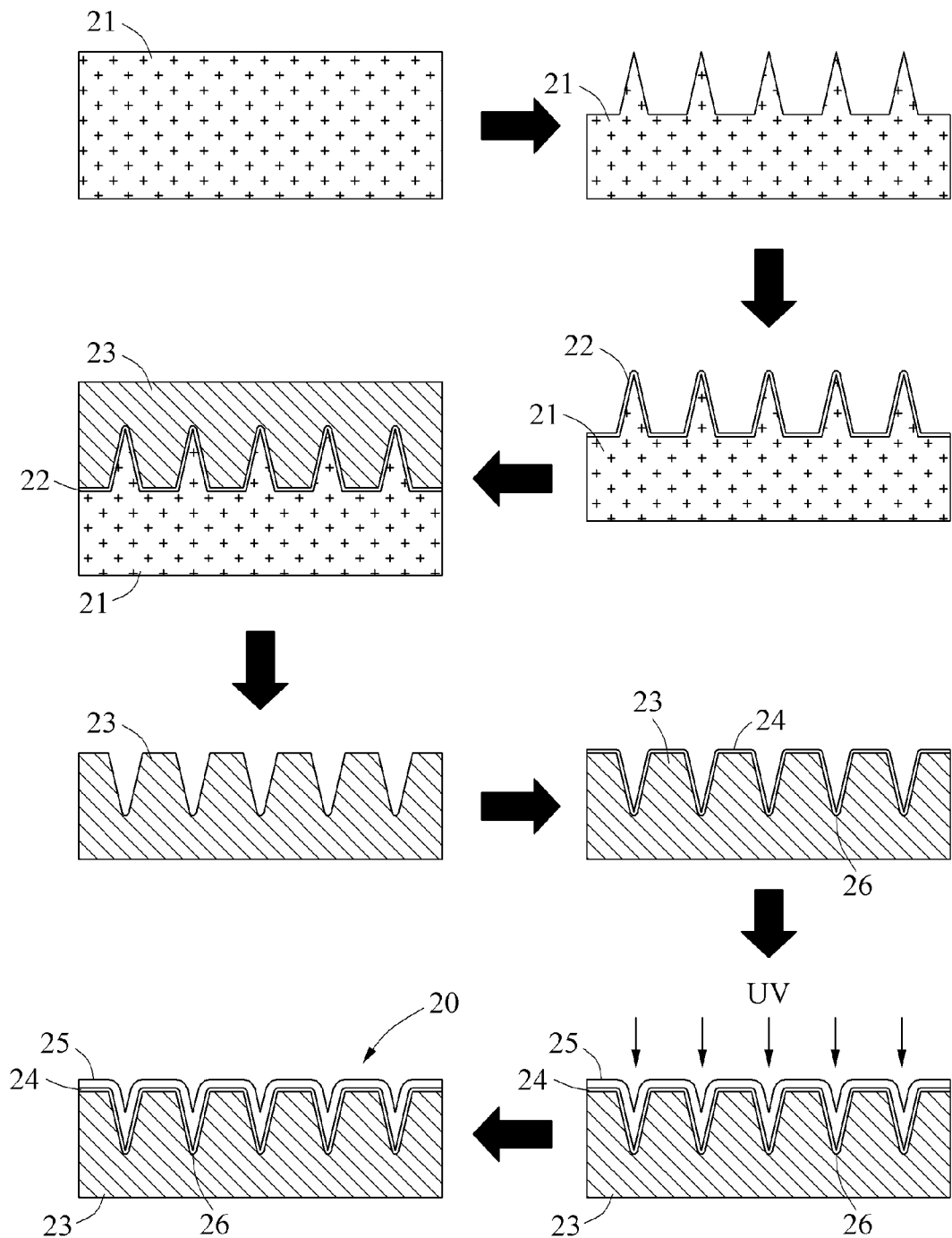
FIG. 4 is a diagram illustrating a process of manufacturing a thermoresponsive smart adhesive pad according to an example embodiment.

FIG. 4 is a diagram illustrating a process of manufacturing a thermoresponsive smart adhesive pad according to an example embodiment.

Referring to FIG. 4, a photolithography and dry etching are performed in a mold. The mold may include, for example, a Si substrate 21. The photolithography is a scheme of fabricating and inserting integrated circuits, parts, thin film circuits, printed wiring patterns, and the like, using a photographic printing technology on a surface of a semiconductor, and is typically a process of uniformly coating a clean surface of a silicon substrate with photoresist liquid by spin coating, spray coating or dip coating, and of selectively irradiating light through a mask after drying. On the Si substrate 21 on which the photolithography and dry etching are performed, a parylene thin film 22 is deposited. The parylene thin film 22 is deposited on the Si substrate 21 to easily detach a polymer layer 23 to be used from the Si substrate 21. The polymer layer 23 prepared by pouring a polymer mixed solution and performing heating at 80° C. for 4 hours is formed on the parylene thin film 22 and is detached, and concave grooves 26 are generated in the polymer layer 23. An $O_2$ plasma treatment or UV/ozone surface treatment is performed on a top of the polymer layer 23 in which the concave grooves 26 are formed. By the $O_2$ plasma treatment or UV/ozone surface treatment, a hydrophilic surface layer 24 is formed on the polymer layer 23. The hydrophilic surface layer 24 is formed on the polymer layer 23 including the concave grooves 26, a hydrogel monomer material mixed solution is uniformly applied onto the hydrophilic surface layer 24, and a hydrogel coating layer 25 is formed through a photopolymerization. To apply the hydrogel monomer material mixed solution to the polymer layer 23 on which the hydrophilic surface layer 24 is formed, drop-casting, spray coating, spin coating or dip coating may be used. Through the photopolymerization by irradiating UV rays to the hydrogel monomer material mixed solution uniformly applied to the polymer layer 23 including the concave grooves 26 on which the hydrophilic treatment is performed, a thermoresponsive smart adhesive pad 20 is manufactured. When the hydrogel monomer material mixed solution is applied onto the polymer layer 23 and the photopolymerization is performed, the hydrogel monomer material mixed solution applied onto the polymer layer 23 is synthesized to a hydrogel through the photopolymerization, and simultaneously is strongly bonded to a top surface of the polymer layer 23 including the concave grooves, to form the hydrogel coating layer 25. The hydrogel coating layer 25 synthesized by a strong bond to the top surface of the polymer layer 23 may not be easily damaged even when the hydrogel coating layer 25 is repeatedly reused, and may not be easily separated from the coated polymer layer 23. This plays an important role in an excellent durability and reusability of the thermoresponsive smart bonding pad 20.

The hydrophilic treatment performed on a surface of the polymer layer including the plurality of concave grooves may include, for example, an $O_2$ plasma treatment or UV/ozone surface treatment. A volume of a hydrogel colloid of a coating layer may vary by absorbing water around the coating layer, and accordingly the polymer layer may need to have hydrophilicity. The coating layer may suck moisture around the thermoresponsive smart adhesive pad at a low temperature, and accordingly a volume may increase. Thus, water or moisture may desirably be present around the thermoresponsive smart adhesive pad.

The mixed solution may include the hydrogel monomer, and the hydrogel monomer may be photopolymerized by irradiating the UV rays.

Hereinafter, a process of manufacturing a thermoresponsive smart adhesive pad and comparing performances of the thermoresponsive smart adhesive pad will be described in detail with reference to example and comparative examples. However, this is merely an example and the present disclosure is not intended to be limited to the example embodiments.

EXAMPLE

A hydrophilic surface layer was formed by performing an $O_2$ plasma treatment of PDMS as a polymer layer, and pNIPAM was used as a coating layer formed on the polymer layer on which the hydrophilic treatment was performed, to manufacture a thermoresponsive smart adhesive pad. Concave grooves were formed, each of the concave grooves has a diameter of 1.0 μm, and a distance between centers of the concave grooves is 5.5 μm.

Comparative Example 1

An adhesive pad including only PDMS as a polymer layer was manufactured.

A total thickness of the adhesive pad was the same as a thickness of the polymer layer of the Example.

Comparative Example 2

An adhesive pad was manufactured under the same condition as Comparative Example 1 except that PS_b_P2VP was used as a component of a polymer layer.

Table 1 shows a comparison of an adhesive strength, an adhesion switching ratio at adhesion or removal and a pre-load which are performances of the thermoresponsive smart adhesive pad of the Example, and the adhesive pads of Comparative Examples 1 and 2.

TABLE 1

| | Adhesive strength (kPa) | Adhesion switching ratio | Pre-load (kPa) |
|---|---|---|---|
| Example | 94 | 293 | — |
| Comparative Example 1 | 8 | 8 | 40 |
| Comparative Example 2 | 0.07 | 9.3 | 0.31 |

The thermoresponsive smart adhesive pad of the Example has a maximum adhesive strength of 94 kilopascal (kPa), and accordingly the thermoresponsive smart adhesive pad is found to have a considerably higher adhesive strength than those of the adhesive pads of Comparative Examples 1 and 2.

Also, the thermoresponsive smart adhesive pad of the Example has a maximum adhesion switching ratio of 293, and the adhesive pads of Comparative Examples 1 and 2 have an adhesion switching ratio of 8 and an adhesion switching ratio of 9.3, respectively. Thus, it is found that the adhesion switching ratio of the thermoresponsive smart adhesive pad is considerably higher than those of the adhesive pads.

In addition, the thermoresponsive smart adhesive pad of the Example does not require a pre-load, whereas the adhesive pad of Comparative Example 1 requires a pre-load of 40 kPa and the adhesive pad of Comparative Example 2 requires a pre-load of 0.31 kPa. Thus, it is found that the adhesive pads of Comparative Examples 1 and 2 require a relatively high pre-load.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A thermoresponsive adhesive pad comprising:
   a polymer layer comprising a plurality of concave grooves;
   a hydrophilic surface layer formed on the polymer layer; and
   a coating layer comprising a hydrogel and formed on the hydrophilic surface layer.

2. The thermoresponsive adhesive pad of claim 1, wherein the polymer layer comprises at least one selected from the group consisting of polydimethylsiloxane, polyethylene, polypropylene, polycarbonate, polystyrene, polymethyl methacrylate, polychlorinated biphenyl, hydrophobically-treated silicon, polymethylphenylsiloxane and tetramethyldisiloxane.

3. The thermoresponsive adhesive pad of claim 1, wherein the plurality of concave grooves are consecutively arranged at regular intervals.

4. The thermoresponsive adhesive pad of claim 1, wherein a distance between centers of neighboring concave grooves among the plurality of concave grooves ranges from 4 micrometers (μm) to 12 μm.

5. The thermoresponsive adhesive pad of claim 1, wherein the plurality of concave grooves have a maximum diameter of 0.5 μm to 7 μm and a maximum depth of 0.5 μm to 2 μm.

6. The thermoresponsive adhesive pad of claim 1, wherein the hydrophilic surface layer is formed by performing an $O_2$ plasma treatment or ultraviolet (UV)/ozone treatment of a surface of the polymer layer.

7. The thermoresponsive adhesive pad of claim 1, wherein the hydrogel comprises at least one selected from the group consisting of poly(N-isopropylacrylamide) (poly(NIPAM)), poly(N-isopropylacrylamide-co-allylamine) (poly(NIPAM-co-AA)), poly(N-isopropylacrylamide-co-2-(dimethylamino)ethyl methacrylate) (poly(NIPAM-co-DMAEMA)), poly(N-isopropylacrylamide-co-2-(dimethylamino)ethyl acrylate) (poly(NIPAM-co-DMAEA)), poly(N-isopropylacrylamide-co-acrylic acid) (poly(NIPAM-co-AAc)), poly(N-isopropylacrylamide-co-methacrylic acid) (poly(NIPAM-co-MAAc)), poly(N, N-diethylacrylamide), poly(N-vinlycaprolactam), poly(ethylene glycol) and poly(ethylene glycol-b-propylene glycol-b-ethylene glycol).

8. The thermoresponsive adhesive pad of claim 1, wherein the hydrogel changes a space volume in the plurality of concave grooves based on a temperature, and a rate of change in the space volume is greater than or equal to 200%.

9. The thermoresponsive adhesive pad of claim 1, wherein the coating layer contracts at a temperature of 30° C. to 34° C. and expands at a temperature less than the temperature of 30° C. to 34° C.

10. The thermoresponsive adhesive pad of claim 1, wherein
the polymer layer has a thickness of 500 μm to 1 centimeter (cm), and
the coating layer has a thickness of 70 nanometers (nm) to 110 nm.

11. A method of manufacturing a thermoresponsive adhesive pad, the method comprising:
forming a plurality of convex structures on a substrate;
forming a plurality of concave grooves in a polymer layer using the substrate on which the plurality of convex structures are formed;
forming a hydrophilic surface layer by performing a hydrophilic treatment of a surface of the polymer layer in which the plurality of concave grooves are formed;
forming, on the hydrophilic surface layer, a coating layer comprising a mixed solution containing a hydrogel monomer; and
irradiating ultraviolet (UV) rays to the coating layer.

12. The method of claim 11, wherein the forming of the hydrophilic surface layer comprises performing an $O_2$ plasma treatment or UV/ozone treatment of the surface of the polymer layer.

13. The method of claim 11, wherein
the mixed solution comprises the hydrogel monomer, and
the hydrogel monomer is photopolymerized by irradiating the UV rays.

* * * * *